(12) United States Patent
Klank et al.

(10) Patent No.: US 12,174,078 B2
(45) Date of Patent: Dec. 24, 2024

(54) METHOD FOR PRODUCING A SENSOR DEVICE AND COMPONENT AND/OR CHASSIS COMPONENT COMPRISING A SENSOR DEVICE OF THIS KIND

(71) Applicant: ZF Friedrichshafen AG, Friedrichshafen (DE)

(72) Inventors: Michael Klank, Osnabrück (DE); Thomas Koehne, Osnabrueck (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 464 days.

(21) Appl. No.: 17/441,481

(22) PCT Filed: Feb. 21, 2020

(86) PCT No.: PCT/EP2020/054569
§ 371 (c)(1),
(2) Date: Sep. 21, 2021

(87) PCT Pub. No.: WO2020/193024
PCT Pub. Date: Oct. 1, 2020

(65) Prior Publication Data
US 2022/0178774 A1    Jun. 9, 2022

(30) Foreign Application Priority Data
Mar. 26, 2019   (DE) ............... 10 2019 204 178.7

(51) Int. Cl.
*G01L 1/22* (2006.01)
*B29C 45/14* (2006.01)
*B29L 31/34* (2006.01)

(52) U.S. Cl.
CPC ...... *G01L 1/2287* (2013.01); *B29C 45/14639* (2013.01); *B29L 2031/3406* (2013.01)

(58) Field of Classification Search
CPC ............... G05B 15/02; G05B 19/0426; G05B 2219/2628; G05B 2219/2642;
(Continued)

(56) References Cited

U.S. PATENT DOCUMENTS

2002/0067241 A1   6/2002  Armstrong
2009/0087253 A1   4/2009  Spratte et al.
(Continued)

FOREIGN PATENT DOCUMENTS

DE   10 2005 030 971 A1   1/2007
DE   10 2016 204 557 A1   9/2017
(Continued)

OTHER PUBLICATIONS

German Office Action Corresponding to 10 2019 204 178.7 mailed Apr. 30, 2020.
(Continued)

*Primary Examiner* — Vishal I Patel
(74) *Attorney, Agent, or Firm* — Finch & Maloney PLLC

(57) ABSTRACT

A method for producing a sensor device (2) for the measurement of an instantaneous load on a component (1, 15), in which the component (1, 15) is made of plastic, in which a sensor layer (3) is arranged in the component (1, 15). The sensor layer (3) is formed of a carrier material with electrically conductive particles embedded therein. To be able to measure or determine loads and/or forces in the component (1, 15) in a better an/or more reliable way, the method includes forming at least one blind hole-like recess (4) in the component (1, 15) to receive the sensor layer (3).

9 Claims, 2 Drawing Sheets

(58) Field of Classification Search
CPC ........ G05B 19/042; G05B 2219/25011; G05B 2219/25252; G05B 2219/2614; B29L 2031/3406; B29C 45/14639; G01L 1/2287

See application file for complete search history.

(56) References Cited

U.S. PATENT DOCUMENTS

2011/0307214 A1   12/2011   Saitou et al.
2016/0282222 A1    9/2016   Weippert et al.

FOREIGN PATENT DOCUMENTS

EP        3 211 396 A1      8/2017
WO    WO-2004068095 A1 *   8/2004   .......... G01M 5/0025

OTHER PUBLICATIONS

International Search Report Corresponding to PCT/EP2020/054569 mailed Jun. 5, 2020.
Written Opinion Corresponding to PCT/EP2020/054569 mailed Jun. 5, 2020.

* cited by examiner

METHOD FOR PRODUCING A SENSOR DEVICE AND COMPONENT AND/OR CHASSIS COMPONENT COMPRISING A SENSOR DEVICE OF THIS KIND

This application is a National Stage completion of PCT/EP2020/054569 filed Feb. 21, 2020, which claims priority from German patent application serial no. 10 2019 204 178.7 filed Mar. 26, 2019.

FIELD OF THE INVENTION

The invention relates to the production of a sensor device for measuring an instantaneous load on a component, in which the component is made of plastic, in which a sensor layer is arranged in the component, wherein the sensor layer comprises a carrier material having electrically conductive particles embedded therein. In addition the invention relates to a component and/or chassis component which is produced in accordance with a method of the type.

BACKGROUND OF THE INVENTION

Such a method and component are known from DE 10 2016 204 557 A1. According to this the sensor layer is in the form of a coating on the component. For example, the sensor layer can be in the form of a paint. Alternatively, the sensor layer can be formed by spraying the carrier material containing the embedded electrically conductive particles onto the component.

The disadvantage of that, however, is that it is difficult to measure loads and particularly forces in the component, for example a ball joint, by means of a sensor device of that type. Even if the sensor layer were not to be applied on the outside of the component but on an inner side between two parts of the component, the loads there would often be so high that the, in particular, thin sensor layers would be damaged. In particular the loads between a ball socket and a joint ball, or between a joint housing and the ball socket, are so high that a sensor layer applied there would be damaged.

SUMMARY OF THE INVENTION

The purpose of the present invention is to further develop a method, a component and/or a chassis component of the type mentioned at the start, in such manner that loads and/or forces in the component can be measured or determined better and/or more reliably. In particular, an alternative embodiment should be provided.

The purpose of the invention is achieved by a method according to the independent claim(s) and by means of a component and/or chassis component according to the independent claim(s). Preferred further developments of the invention emerge from the subordinate claims and from the description below.

Thus, the invention relates to a method for producing a sensor device for the measurement of an instantaneous load on a component. In particular, the measurement of an instantaneous load on the component is understood to mean the measurement, ascertaining and/or determination of a force or force component acting on and/or in the component. Thus, the sensor device can be designed to measure an instantaneous force or force component acting on the component. When the component is under load, the component may be deformed. In particular, the instantaneous load on the component can result in an elastic or plastic deformation of the component.

The component is made of plastic. Preferably, the component is produced by means of an injection-molding process in an injection-molding die. In particular, the component itself is not electrically conductive. Furthermore, in accordance with the method a sensor layer is applied on the component. In this case the sensor layer comprises a carrier material with electrically conductive particles embedded in it. Preferably, the sensor layer consists of the carrier material and the electrically conductive particles embedded in it. In particular, by virtue of the electrically conductive particles the sensor layer enables electrical resistance measurements to be carried out. From the electrical resistance measurements at the sensor device or sensor layer, the instantaneous load, in particular a force or force component acting on the component, can be determined. In the component at least one blind hole-like recess for receiving the sensor layer is formed.

In this context, it is advantageous that by virtue of the blind hole-like recess for receiving the sensor layer, the sensor layer does not have to be applied on an open surface of the component. Instead, the sensor layer can be applied and/or embedded in the blind hole-like recess and/or the component itself. In that way the sensor layer can be better protected against undesired damage and/or premature wear. Thereby, a lasting and reliable measurement of the instantaneous loading of the component can be ensured, preferably over the lifetime of the component. The blind hole-like recess can already be formed when the component is made. Alternatively, the blind hole-like recess can be made after the component has been produced, in particular by drilling a bore. The blind hole-like recess can be of shaft-like or pocket-like form.

According to a further development, the blind hole-like recess can be filled at least partially with the carrier material in the form of a liquid, with the electrically conductive particles embedded in it. A liquid carrier material with the embedded electrically conductive particles can be introduced particularly simply into the blind hole-like recess. The blind hole-like recess can be filled or topped up at least partially with the liquid carrier material and the embedded electrically conductive particles under the effect of gravity and/or by capillary action. The blind hole-like recess can have a diameter of a few millimeters. Preferably, the diameter of the blind hole-like recess is less than 3 mm, less than 2 mm or less than 1 mm. In particular, a paint is used as the carrier material. Such carrier materials with embedded electrically conductive particles are already known and have proved their worth. Preferably, the electrically conductive particles are in the form of carbon nano-tubes (CNT). In particular, the electrically conductive particles are isotropically orientated and/or distributed within the carrier material. Preferably, the electrically conductive particles are in the form of force-sensitive elements. In particular, the carbon nano-tubes are microscopically small, tubular shapes of carbon. Carbon nano-tubes are electrically conductive and also have the property that on mechanical loading, for example they undergo an extension or compression resulting from the action of force, they change their electrical resistance. This effect can be used for using carbon nano-tubes as force-sensitive elements. Alternatively, force-sensitive elements can be in the form of graphene, graphene oxide, soot or nano-wires.

According to a further development, the carrier material with the embedded electrically conductive particles hardens after the at least partial filling and/or topping up of the blind hole-like recess. Alternatively or in addition, the carrier material is cured. Thus, the hardening of the carrier material can be actively brought about or promoted by suitable measures. For example, local warming can favor or accelerate the hardening of the carrier material. After the carrier material has hardened, it with its electrically conductive particles is held reliably and/or lastingly inside the blind hole-like recess. In particular, by virtue of the hardening of the carrier material the sensor layer is formed inside the blind hole-like recess. In this case the sensor layer and/or the carrier material can be joined to the component on an inside or inner circumferential surface of the blind hole-like recess in a firmly bonded manner. In particular, by virtue of the predetermined diameter or internal size of the blind hole-like recess, a layer thickness of the sensor layer is predetermined. This at the same time simplifies reproducibility, which is desirable for mass production.

According to a further embodiment, at least two electrically conducting sections are embedded in the component in order to provide contact points for the sensor layer. In particular, the conducting sections are overmolded and/or over-injected with the plastic of the component during the production of the component. Thereby, by virtue of incorporation and/or integration of the conducting sections in the component, they are protected against outside influences and durably fixed. The contact points themselves are not covered by the plastic of the component. The conducting sections and the contact points are arranged in such manner that the contact points are accessible through the blind hole-like recess for the sensor layer. Preferably, the contact points are arranged on an inner circumferential surface of the blind hole-like recess. Alternatively, the contact points project into the blind hole-like recess.

Preferably, the contact points formed by the two electrically conducting sections are electrically connected to one another by the sensor layer itself. Thus, an electrically conducting connection between the contact points is produced through or by means of the sensor layer, which is arranged in the blind hole-like recess. The conducting sections can be in the form of stamped grids or wires. This enables an inexpensive production and/or a simple arrangement in the component, particularly in the injection-molding die for producing the component.

According to a further development, the contact points are arranged a distance apart from one another in the longitudinal direction of the blind hole-like recess. In particular, the blind hole-like recess is filled and/or topped up with the liquid carrier material and its embedded electrically conductive particles until the contact points make contact with the carrier material and/or the embedded electrically conductive particles. Preferably, a first contact point is positioned close to the bottom of the blind hole-like recess. A second contact point can be arranged close to an opening of the blind hole-like recess. In that way the first contact point can be associated with a first conducting section and the second contact point with a second conducting section. To improve the electrical conductivity, the carrier material itself can be electrically conductive. In particular, the measurement, determination and/or ascertaining of the load acting is independent of the quantity of carrier material filled in to form the sensor layer, provided that the two contact points are electrically conductively connected to one another by the sensor layer. In contrast, how far the sensor layer reaches above and beyond the contact point associated with the opening, is immaterial for the mode of operation of the sensor device.

In a further development, the sensor device is connected to an evaluation unit. From electric resistance measurements in the sensor layer the evaluation unit can determine and/or ascertain the instantaneous load acting on the component. In particular, at least a force and/or force component acting on the component can be determined and/or ascertained. For example, a shear, compression or tensile load on the component can be determined. In particular, a tensile force acting on the component can be determined from a measured, determined and/or ascertained extension of the sensor layer. A compression force acting upon the component can be determined from a measured, determined and/or ascertained contraction of the sensor layer.

Preferably, a plurality of blind hole-like recesses are arranged and/or formed in the component, each for receiving a sensor layer. In that way a sensor device having a plurality of sensor layers can be produced. The several blind hole-like recesses and/or several sensor layers can be arranged in the component in a suitable manner, so that by means of the evaluation unit, taking account of the measurements on several sensor layers, the loading of the component, in particular a force or a plurality of force components acting on the component, can be determined in even more detail. For example a bending force and/or torsion acting on the component can be determined. Preferably the sensor device, in particular the plurality of sensor devices, is/are designed so as to determine forces acting instantaneously on the component in a manner related to position and/or direction.

According to a further development, the component is designed as a chassis component for a vehicle, in particular a motor vehicle. For example, the component can be in the form of a ball socket and/or a joint housing for a ball joint. Such a ball joint can for example be a ball sleeve joint or a ball pin joint. Thus, the blind hole-like recess with the sensor layer can be arranged in the ball socket and/or in the joint housing. By means of a sensor device of this type, forces acting in the ball joint can be determined. In particular a plurality of blind hole-like recesses, each with a sensor layer, can be arranged distributed around a joint ball in the ball socket and/or in the joint housing. In that way a position-related and/or direction-related determination of the acting forces and/or force components can be carried out. The several blind hole-like recesses and/or sensor layers can be distributed uniformly around the joint ball in the ball socket and/or in the joint housing. In particular, at least two or more blind hole-like recesses and/or sensor layers are arranged transversely or perpendicularly to one another. This can improve a position-related and/or direction-related resolution or determination of the acting forces and/or force components.

Of particular advantage is a component and/or chassis component which is produced in accordance with the method according to the invention, wherein the sensor layer is held in the at least one blind hole-like recess. Particularly when the component is in the form of a ball socket and/or a joint housing, the sensor layer in the blind hole-like recess is protected against external influences and/or increased wear.

In particular, the component and/or chassis component produced according to the method according to the invention is a component and/or chassis component as described previously. Preferably, the method is developed further in accordance with all the design features explained in connection with the component and/or chassis component according to the invention described herein. Furthermore, the component and/or chassis component described herein can be developed further in accordance with all the features explained in connection with the method.

BRIEF DESCRIPTION OF THE DRAWINGS

Below, the invention is explained in greater detail with reference to the figures. In these, the same indexes denote the same, similar or functionally equivalent components or elements. The figures show.

DETAILED DESCRIPTION OF THE PREFERRED EMBODIMENTS

Figure 1:
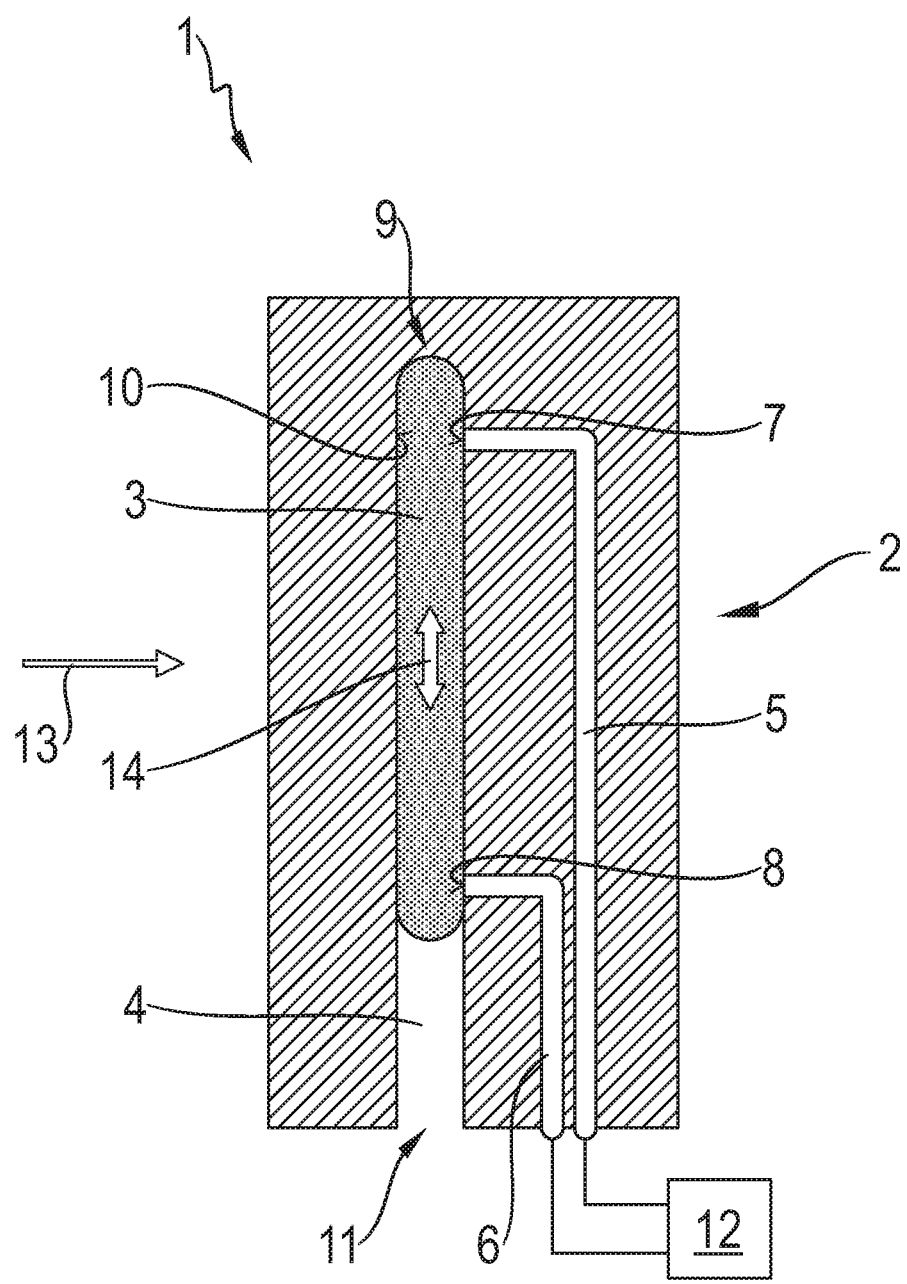
FIG. 1: A sectional schematic side view of a component according to the invention.

FIG. 1 shows a sectional schematic side view of a component 1 according to the invention. The component 1 is made of plastic. The component 1 has a sensor device 2. The sensor device 2 comprises a sensor layer 3. The sensor layer 3 is formed by a carrier material with electrically conductive particles embedded in it, which are not shown is detail here. In this example embodiment, the electrically conductive particles are in the form of carbon nano-tubes.

The component 1 has a blind hole-like recess 4. The blind hole-like recess 4 extends like a shaft into the component 1. The sensor layer 3 is located inside the blind hole-like recess 4. In this example embodiment the blind hole-like recess 4 is only partially filled or topped up with the sensor layer 3. Alternatively, the blind hole-like recess 4 can also be completely filled or topped up with the sensor layer 3.

The sensor device 2 comprises two electrically conducting sections 5, 6. The two electrically conducting sections 5, 6 are essentially embedded in the component 1. Here, the electrically conducting sections 5, 6 form contact points 7, 8 for the sensor layer 3. For that, the two contact points 7, 8 are electrically connected to the sensor layer 3. The electrically conducting sections 5, 6 can be in the form of stamped grids. A first contact point 7, in particular of the first electrically conducting section 5, is arranged close to the bottom 9 of the blind hole-like recess 4, on an internal surface 10 of the blind hole-like recess 4. A second contact point 8, in particular of the second electrically conducting section 6, is arranged close to an opening 11 of the blind hole-like recess 4 on the internal surface 10. The ends of the electrically conducting sections 5, 6 remote from the contact points 7, 8 are connected to an evaluation unit 12.

To produce the component 1 with the sensor device 2, first the electrically conducting sections 5, 6, for example in the form of stamped grids, are arranged in an injection-molding die (not shown). Then the component 1 is made from a plastic. During this the electrically conducting sections 5, 6 are at the same time partially overmolded or over-injected by the plastic of the component 1. During the production of the component 1 the blind hole-like recess 4 can be made at the same time. Alternatively, the blind hole-like recess 4 can be produced after the component 1 has been made, by drilling a bore.

Thereafter, the blind hole-like recess 4 is partially or completely filled or topped up with a liquid carrier material in which the electrically conductive particles are embedded. During this it is important that as much carrier material is filled into the blind hole-like recess 4 as is needed to make contact with both the contact point 7 and with the contact point 8 of the two electrically conducting sections 5, 6. On the other hand, how far the blind hole-like recess 4 is filled beyond that is not relevant for the function of the sensor device 2.

In this example embodiment, the liquid carrier material is in the form of a paint with embedded electrically conductive particles. The carrier material can be filled into the opening 11 in the blind hole-like recess 4 the under the effect of gravity and/or capillary action. Thereafter, the carrier material hardens and/or is actively cured so as to form the sensor layer 3.

Finally, the ends of the electrically conducting sections 5, 6 remote from the contact points 7, 8 are connected to the evaluation unit 12. From electrical resistance measurements in the sensor layer 3, an instantaneous load and/or action of force on the component 1 can be determined by the evaluation unit 12. With a load or force action which, as indicated by the arrow 13, is directed transversely or perpendicularly to the longitudinal extension of the sensor layer 3 or the blind hole-like recess 4, as shown by the arrow 14 there is an extension or stretching of the sensor layer 3. This also results in an extension or stretching of the electrically conductive particles, which results in a change of the resistance of the sensor layer 3. In the case of a decreasing load on the component 1, for example directed oppositely to the arrow 13, i.e. transversely or perpendicularly to the length of the sensor layer 3 and directed away from it, the sensor layer 3 contracts again. Thereby the electrically conductive particles in the sensor layer 3 become shorter and this in turn results in a change of the electrical resistance of the sensor layer 3.

Figure 2:
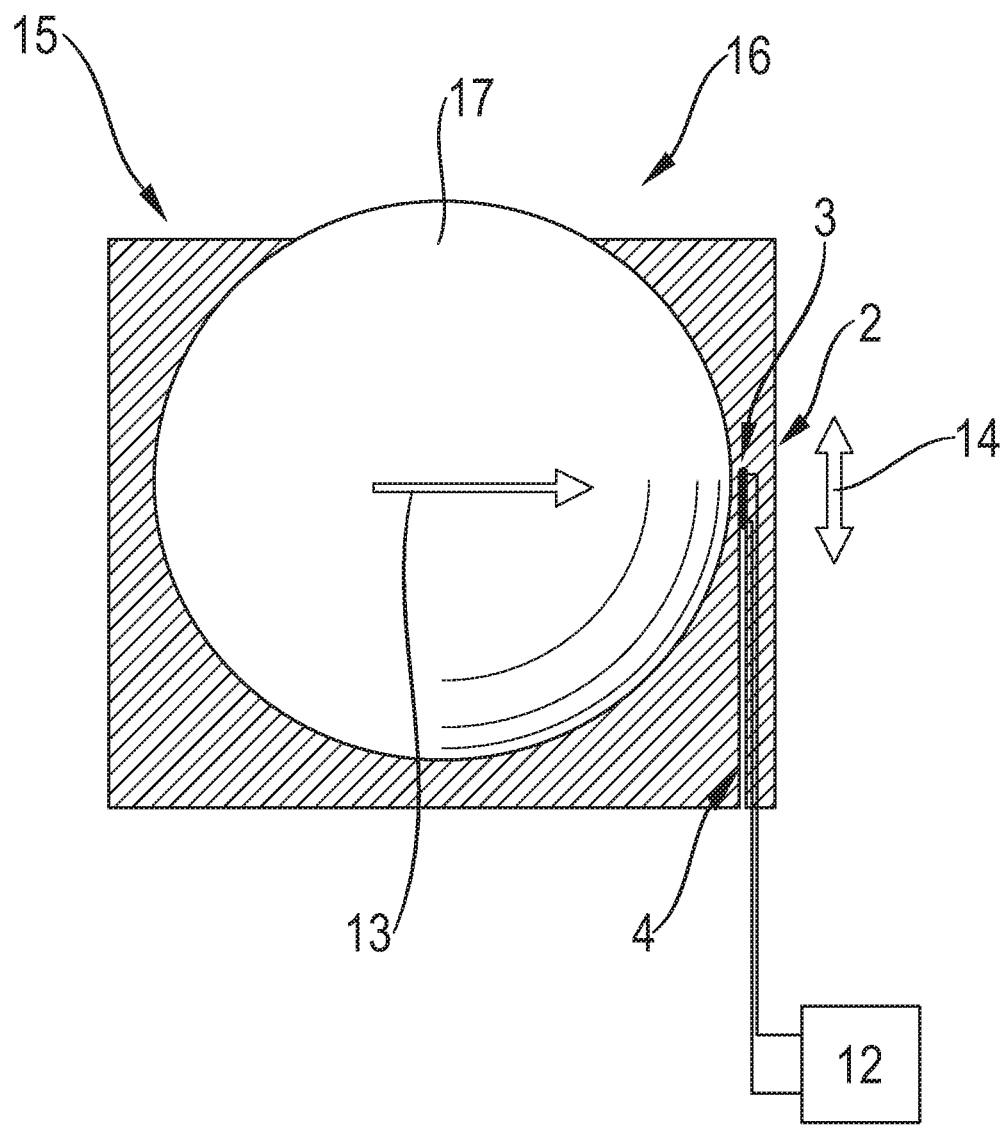
FIG. 2: A sectional schematic side view of a chassis component according to the invention.

FIG. 2 shows a sectional schematic side view of a chassis component 15 according to the invention. In this example embodiment the component 15 is a ball socket for a ball joint 16, which in this case is only indicated schematically. The ball joint 16 comprises a joint ball 17, which is fitted into the ball socket 15 so that it can move.

The ball socket 15 has a sensor device 2, which is essentially formed as in the representation in FIG. 1. Accordingly, reference should also be made to the preceding description.

During the use of the ball joint 16, various loads and/or forces act on the ball socket 15 by way of the joint ball 17. Here, the varying loads and/or forces directed transversely or perpendicularly to the longitudinal extension of the sensor device 2, for example as indicated by the arrow 14, bring about an extension or contraction of the sensor layer 3 as indicated by the arrow 14. The resulting resistance changes of the sensor layer 3 are measured, whereby the loads and/or forces acting are determined by means of the evaluation unit 12.

The ball socket 15 can have a plurality of blind hole-like recesses 4, each with a sensor layer 3. The several blind hole-like recesses 4 or sensor layers 3 can be distributed uniformly around the joint ball 17. In this case two or more of the blind hole-like recesses 4 or sensor layers 3 can be directed transversely or perpendicularly to one another with regard to their respective length. This enables a better position-related and/or direction-related determination of the loads and/or forces that are acting.

INDEXES

1 Component
2 Sensor device
3 Sensor layer
4 Blind hole-like recess
5 Electrically conducting section 6 Electrically conducting section
7 Contact point
8 Contact point
9 Bottom
10 Inner circumferential surface
11 Opening
12 Evaluation unit
13 Arrow
14 Arrow
15 Chassis component/ball socket
16 Ball joint
17 Joint ball

The invention claimed is:

1. A method for producing a sensor device for measurement of an instantaneous load on a component, in which the component is made of plastic and a sensor layer is arranged in the component, the method comprising:
    forming the component with the plastic and, while forming the component, partially overmolding and/or over-injecting electrically conducting sections with the plastic forming the component,
    either concurrently with or subsequent to forming the component, forming at least one blind hole-like recess in the component which receives the sensor layer, and
    forming the sensor layer with a carrier material having electrically conductive particles embedded therein by at least partially filling the blind hole-like recess with the carrier material such that the carrier material contacts the electrically conducting sections.

2. The method according to claim 1, further comprising at least partially filling the blind hole-like recess, under an effect of at least one of gravity or capillary action, with the carrier material in the form of a liquid with the electrically conductive particles embedded therein, and a paint is used as the carrier material, the electrically conducting sections being arranged to contact the sensor layer at points that are a distance apart from each other in a longitudinal direction of the blind hole-like recess.

3. The method according to claim 2, further comprising, after at least partial filling of the blind hole-like recess, at least one of hardening and curing the carrier material with the electrically conductive particles.

4. The method according to claim 1, further comprising embedding at least two electrically conducting sections in the component in order to provide contact points for the sensor layer.

5. The method according to claim 4, further comprising electrically connecting the contact points provided by the electrically conducting sections to one another by way of the sensor layer, and using either stamped grids or wires for the electrically conducting sections.

6. A method for producing a sensor device for measurement of an instantaneous load on a component, in which the component is made of plastic and a sensor layer is arranged in the component, the method comprising:
    forming the sensor layer with a carrier material having electrically conductive particles embedded therein,
    forming at least one blind hole-like recess in the component which receives the sensor layer,
    embedding at least two electrically conducting sections in the component in order to provide contact points for the sensor layer, and during the production of the component, and partially overmolding and/or over-injecting the electrically conducting sections with the plastic of the component,
    electrically connecting the contact points provided by the electrically conducting sections to one another by way of the sensor layer, and using either stamped grids or wires for the electrically conducting sections, and
    spacing the contact points a distance apart from one another, in a longitudinal direction of the blind hole-like recess, and at least partially filling the blind hole-like recess with the carrier material with the electrically conductive particles at least until the contact points are in contact with at least one of the carrier material and the electrically conductive particles embedded therein.

7. The method according to claim 1, further comprising connecting the sensor device to an evaluation unit which determines an instantaneous load on the component from electrical resistance measurements in the sensor layer.

8. The method according to claim 1, further comprising arranging a plurality of blind hole-like recesses in the component for receiving a sensor layer in each case.

9. The method according to claim 1, further comprising forming the component as at least one of a chassis component for a vehicle, a ball socket and a joint housing for a ball joint.

* * * * *